US011416200B2

(12) United States Patent
Yin et al.

(10) Patent No.: US 11,416,200 B2
(45) Date of Patent: Aug. 16, 2022

(54) DISPLAY METHOD AND DISPLAY SYSTEM

(71) Applicant: Optoma Corporation, Hsin-Chu (TW)

(72) Inventors: Wei-Wei Yin, Hsin-Chu (TW); Jui-Chi Chen, Hsin-Chu (TW); Yen-Hsiang Hung, Hsin-Chu (TW)

(73) Assignee: Optoma Corporation, New Taipei (TW)

( * ) Notice: Subject to any disclaimer, the term of this patent is extended or adjusted under 35 U.S.C. 154(b) by 18 days.

(21) Appl. No.: 17/075,686

(22) Filed: Oct. 20, 2020

(65) Prior Publication Data

US 2021/0124542 A1 Apr. 29, 2021

(30) Foreign Application Priority Data

Oct. 28, 2019 (CN) .......................... 201911028779.7

(51) Int. Cl.
*G06F 3/14* (2006.01)
(52) U.S. Cl.
CPC .......... *G06F 3/1446* (2013.01); *G06F 3/1438* (2013.01)
(58) Field of Classification Search
CPC combination set(s) only.
See application file for complete search history.

(56) References Cited

U.S. PATENT DOCUMENTS

| 9,047,039 B2 | 6/2015 | Perkins et al. |
| 2009/0160868 A1* | 6/2009 | Yato ........................ G09G 5/006 345/531 |
| 2012/0319975 A1* | 12/2012 | Fuchs ................... G06F 3/0416 345/173 |
| 2015/0103253 A1* | 4/2015 | Higuchi ............. H04N 21/8106 348/705 |
| 2017/0195722 A1* | 7/2017 | Seo ........................ H04N 21/63 |
| 2018/0181252 A1 | 6/2018 | Park et al. |

FOREIGN PATENT DOCUMENTS

| CN | 104301645 | 1/2015 |
| CN | 104679463 | 6/2015 |
| CN | 108269506 | 7/2018 |

(Continued)

OTHER PUBLICATIONS

Method, device and system for tiled display Lei Weilin (English machine translation) (Year: 2015).*

(Continued)

*Primary Examiner* — Van N Chow
(74) *Attorney, Agent, or Firm* — JCIPRNET (57) ABSTRACT

The disclosure relates to a display method and a display system. The display method includes: connecting a plurality of display devices in series with each other, the plurality of display devices including a main display device and at least one slave display device, the main display device having EDID; setting the connection order of the display device; correspondingly changing the EDID of the main display device according to the connection order of the display device; configuring the main display device to receive the display image according to the changed EDID; and configuring the display device to perform an image segmentation operation on the display image according to the connection order to respectively display multiple segmented regions of the display image.

18 Claims, 4 Drawing Sheets

(56) References Cited

FOREIGN PATENT DOCUMENTS

| | | |
|---|---|---|
| CN | 108287675 | 7/2018 |
| CN | 109213465 | 1/2019 |
| CN | 109885270 | 6/2019 |
| JP | 2011257540 | 12/2011 |
| TW | I647611 | 1/2019 |

OTHER PUBLICATIONS

"Office Action of China Counterpart Application", dated Apr. 12, 2022, p. 1-13.

* cited by examiner

DISPLAY METHOD AND DISPLAY SYSTEM

CROSS REFERENCE TO RELATED APPLICATION

This application claims the priority benefits of China application serial no. 201911028779.7, filed on Oct. 28, 2019. The entirety of the above-mentioned patent application is hereby incorporated by reference herein and made a part of specification.

BACKGROUND OF THE DISCLOSURE

Field of the Disclosure

The present disclosure relates to a method and a system, and in particular to a display method and a display system.

Description of Related Art

When a plurality of display devices in the display system are connected, the conventional display method requires manual setting to change the display range of each display device, so that all display devices in the display system can perform display according to the relative connection positions and present the splicing display image. In addition, the display device cannot spontaneously change the extended display identification data (EDID), which further affects the image quality resolution of the display image shown by the display system and spoils the user viewing experience.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE DISCLOSURE

The present disclosure provides a display method and a display system. The extended display identification data (EDID) of the main display device is changed according to the connection relationship of the display devices in the display system, and the display image is segmented through each display device, such that the display system performs display according to the resolution of all connected display devices to enhance the user viewing experience.

Other objects and advantages of the present disclosure can be further understood from the technical features disclosed in the present disclosure.

In order to achieve one or a part or all of the above or other purposes, an embodiment of the present disclosure provides a display method including serially connecting display devices, the display devices include a main display device and at least one slave display device, the main display device has EDID. The display method includes: setting a connection order of the display devices, and correspondingly changing the EDID of the main display device according to the connection order of the display devices. The display method includes: making the main display device to receive the display image according to the changed EDID. The display method includes: making the display device to perform an image segmentation operation on the display image according to the connection order, respectively, to respectively display segmented regions of the display image.

In order to achieve one or a part or all of the above or other purposes, an embodiment of the present disclosure further provides a display system including interconnected display devices, the display devices include a main display device and at least one slave display device, the main display device has EDID. After the connection order of the display devices is set, the EDID of the main display device is correspondingly changed according to the connection order of the display device, and the main display device is configured to receive the display image according to the changed EDID, wherein the display device respectively performs an image segmentation operation on the display image according to the connection order to respectively display segmented regions of the display image.

Based on the above, embodiments of the present disclosure have at least one of the following advantages or effects. The display method and the display system of the present disclosure can splice and display the received display image, change the EDID of the main display device according to the connection order of the plurality of display devices, and further change the image quality resolution of the display image shown by the display system, thereby improving the user viewing experience.

In order to make the aforementioned features and advantages of the disclosure more comprehensible, embodiments accompanying figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical contents, features and advantages of the present disclosure will be apparent from the following detailed description of the preferred embodiments. Directional terms mentioned in the following embodiments, such as: up, down, left, right, front or back, etc., only refer to the direction of the drawing. Therefore, the directional terminology is used to illustrate but not intended to limit the disclosure.

Figure 1:
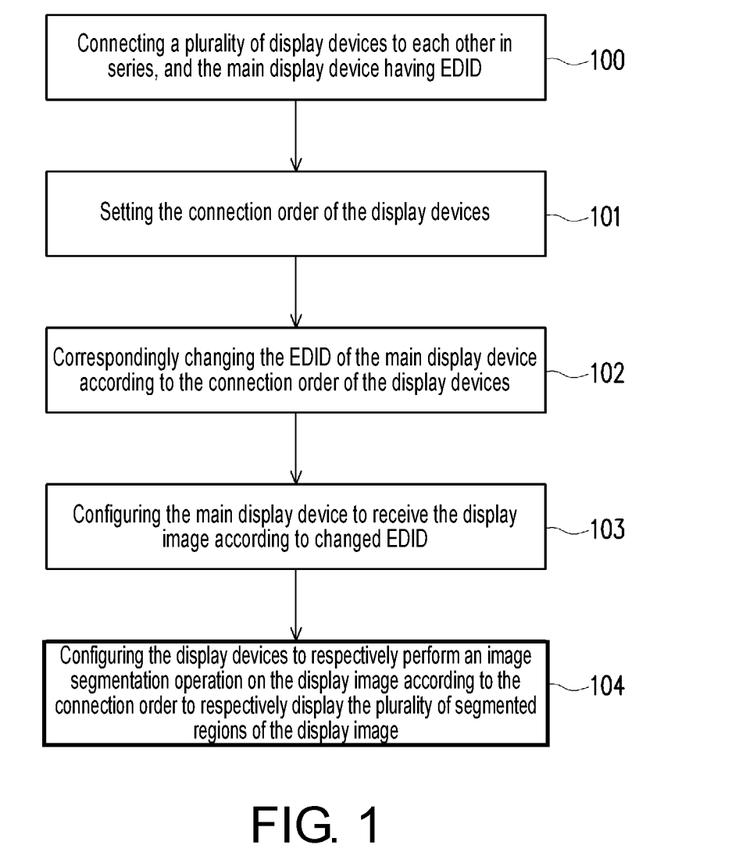
FIG. 1 is a flowchart diagram of a display method according to an embodiment of the present disclosure.

Please refer to FIG. 1. FIG. 1 is a flowchart diagram of a display method according to an embodiment of the present disclosure. More specifically, the display method is applied to a display system having a plurality of display devices connected to each other, and the plurality of interconnected display devices include a main display device and at least one slave display device, the display image is received according to the extended display identification data (EDID) changed by the main display device, such that the display devices respectively perform an image segmentation operation, and the display image is segmented and displayed on multiple display devices connected in series. The display method includes the following steps.

Step 100: A plurality of display devices is configured to connect to each other in series, and the main display device has EDID;

Step 101: The connection order of the display devices is configured to be set;

Step 102: The EDID of the main display device is correspondingly changed according to the connection order of the display devices;

Step 103: The main display device is configured to receive the display image according to changed EDID;

Step 104: The display devices are respectively configured to perform an image segmentation operation on the display image according to the connection order to respectively display the plurality of segmented regions of the display image.

Figure 2:
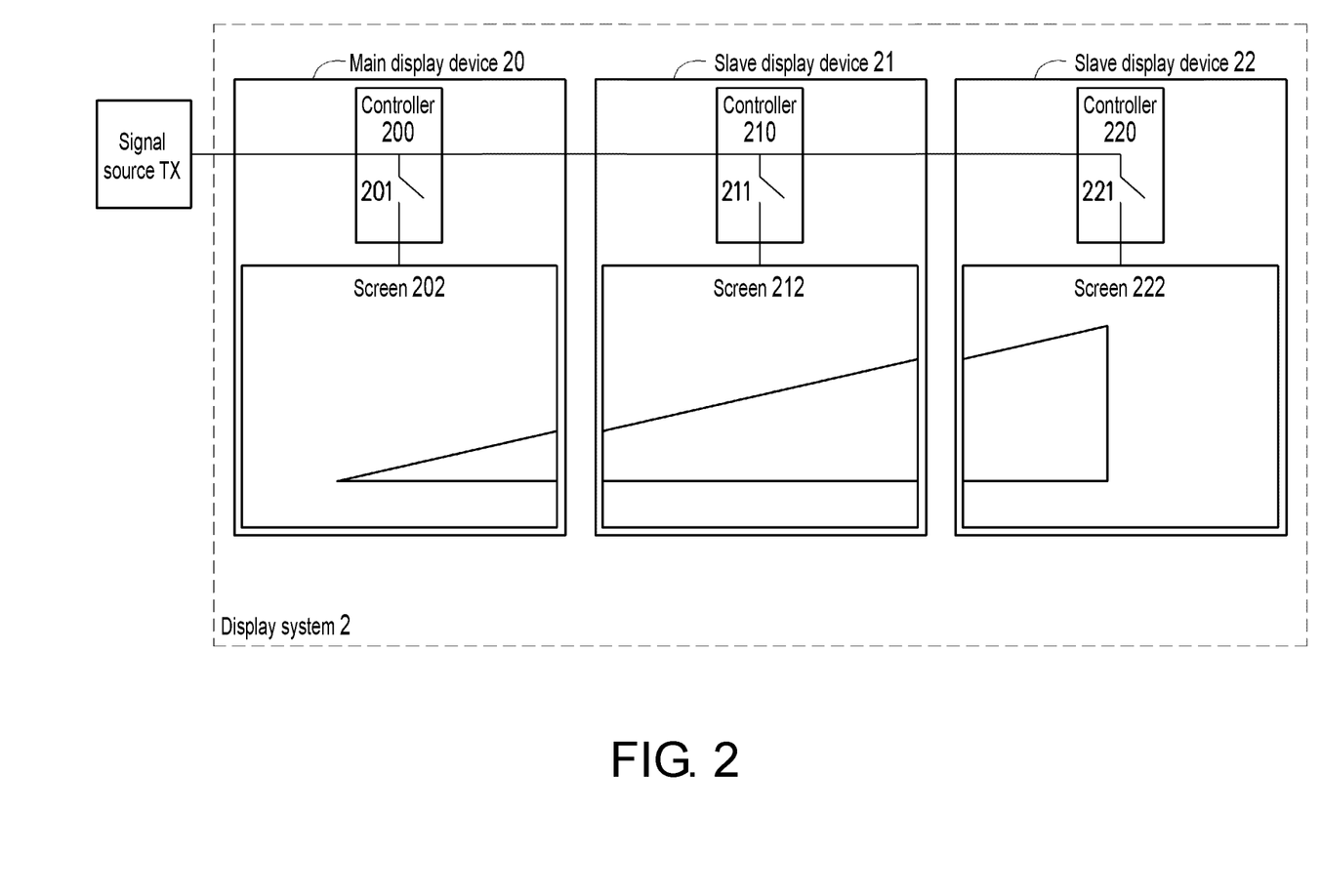
FIG. 2 is a schematic diagram of a display system according to an embodiment of the disclosure.

Please refer to FIG. 2 for details of the above display method. FIG. 2 is a schematic diagram of a display system 2 according to an embodiment of the disclosure. The display system 2 can be applied to the display method illustrated in FIG. 1. The display system 2 will be incorporated below to collaboratively illustrate the display method illustrated in FIG. 1. In FIG. 2, the display system 2 is exemplified with three display devices, but the disclosure is not limited thereto. The display system 2 includes a main display device 20, a slave display device 21, and a slave display device 22. The main display device 20, the slave display device 21 and the slave display device 22 are sequentially connected in series. The main display device 20 is coupled to the signal source TX, and the slave display device 21 and the slave display device 22 need not be coupled to the signal source TX. The signal source TX is, for example, a source that can provide image signals such as a personal computer, a laptop computer, a DVD player, a digital camera, or personal digital assistants (PDAs), etc. The main display device 20 can sequentially transmit the display image received from the signal source TX to the slave display device 21 and the slave display device 22. The main display device 20, the slave display device 21 and the slave display device 22 respectively perform an image segmentation operation on the display image, such that the main display device 20, the slave display device 21, and the slave display device 22 respectively display corresponding segmented regions (i.e., different portions of the triangle) of the display image. Particularly, the image segmentation operation is a process of partitioning a display image into distinct non-overlapping regions or partial overlapping regions.

The main display device 20 includes a controller 200, a switch circuit 201, and a screen 202. The slave display device 21 includes a controller 210 and a screen 212. The slave display device 22 includes a controller 220 and a screen 222. The controllers 200, 210, 220 can process the received display images and transmit them to the screens 202, 212, 222, respectively, so that the screens 202, 212, 222 display the corresponding portions of the display image according to the control of the controllers 200, 210, 220. The controllers 200, 210, 220 can be configured to perform image processing on the display image and control the operations of the display devices 20, 21, 22, respectively. For example, the controllers 200, 210, and 220 may be a central processing unit (CPU), a microprocessor, a microcontroller, a digital signal processor (DSP), field programmable gate array (FPGA), a programmable logic device (PLD), a programmable controller, an application specific integrated circuit (ASIC), or other similar processing device or a combination of these devices. The screens 202, 212, 222 can perform display according to the control of the controllers 200, 210, 220, respectively. For example, the screens 202, 212, and 222 can be Light-Emitting Diode (LED) screens, Organic Light-Emitting Diode (OLED) screens, Liquid Crystal Display screens, plasma screens, an electronic paper screen, a flexible display, a projector, etc., as long as the screen can be integrated with the controller as a display device and connected to other display devices for performing an image segmentation operation to display corresponding segmented regions of the display image, all of which belong to the scope of the present disclosure. In addition, the slave display device 21 may include a switch circuit 211, and the slave display device 22 may include a switch circuit 221 for controlling transmission of the display image. However, in the embodiment, only the main display device 20 may be configured with the switch circuit 201 for controlling the input of display image from the signal source TX, and the slave display devices 21 and 22 may not be configured with the switch circuit.

In step 100, the display devices in the display system 2 are connected to each other, and each of the display devices has its own extended display identification data (EDID). The display device directly connected to the signal source TX in the display system 2 is set as the main display device 20, and the rest of display devices in the display system 2 are set as the slave display devices 21 and 22.

In step 101, the main display device 20 activates an encoding operation to set the encoding value of each connected display device. For example, the controller 200 of the main display device 20 can automatically set its own initial encoding value to 1, and transmit the initial encoding value to the next connected slave display device 21. After the controller 210 of the slave display device 21 receives the initial encoding value 1 from the main display device 20, the encoding value thereof can be set to 2, and the encoding value 2 is transmitted to the next connected slave display device 22. Then, the encoding value of the display device itself is recursively set and the encoding value is transmitted. After the slave display device 22 at the end of the series sets its own encoding value to 3, the controller 220 of the slave display device 22 returns the encoding value to the controller 200 of the main display device 20. Therefore, the display device correspondingly sets its own encoding value according to the connection order and the returned encoding value is equal to the number of the serially connected display devices, and the controller of each connected display device stores its own encoding value and the number of serial connections.

In step 102, the main display device 20 can correspondingly change the EDID thereof. In this embodiment, after the controller 220 of the slave display device 22 returns the encoding value to the controller 200 of the main display device 20, the controller 200 of the main display device 20 can automatically change the EDID thereof according to the order in which the display devices are connected (including the number of connections and the resolution that can be displayed by the serially connected display devices), and the changed EDID is provided to the signal source TX, such that the signal source TX changes the resolution of the transmitted display image.

In step 103, the signal source TX transmits the display image with adjusted resolution to the controller 200 of the main display device 20 according to the EDID of the main display device 20. Then, the controller 200 further transmits the received display image to the controller 210 of the slave display device 21 and the controller 220 of the slave display device 22, so that the controllers 200, 210, and 220 can receive the display image with the changed resolution.

In step 104, the controller of each display device performs an image segmentation operation, and the controller of each display device respectively perform an image segmentation operation on the display image according to the connection order (i.e., the corresponding encoding value) to segment the corresponding region of the display image. In detail, the display device segments the corresponding region of the display image according to the ratio of its own encoding value to the number of serial connections. For example, with respect to the main display device 20, the encoding value thereof is 1 and the number of serial connections is 3, the controller 200 of the main display device 20 extracts the pixel range of the first ⅓ of the display image for display (for example, the image range on the right side of the display image). In different embodiments, the pixel range extracted by the display device can be adjusted according to different design requirements. In an embodiment, the corresponding segmented regions of the display image displayed by each display device do not overlap each other. In an embodiment, the corresponding segmented regions of the display image displayed by each display device are partially overlapped. In an embodiment, in order to match the frame width of the display device, part of the display image pixels may be ignored by the controller of the display device without being extracted. For example, the pixel width of the omitted region of the display image may be substantially equal to the width of the frame of the display device.

In an embodiment, the main display device 20 may perform a hot plugging operation before the step 104, that is, before each display device respectively displays a corresponding segmented region of the display image. In an embodiment, before the display device switches to display the corresponding segmented region of the display image, each display device may first turn off the corresponding screen, and then turn on the screen to display the corresponding segmented region of the display image. For example, the main display device 20 actually performs an operation similar to hot plugging, that is, there is no need to actually re-plug the connection line between the signal source TX and the main display device 20, but the main display device 20 automatically controls the operation of the switch circuit 201 through the controller 200 so as to disconnect the switch circuit 201 before switching the corresponding segmented region of the display image, so that the screen 202 does not display an image or displays a black image. Then the controller 200 controls the switch circuit 201 to reconnect, so as to re-receive the display image from the signal source TX and shows a corresponding segmented region of the display image on the screen 202. In more detail, since the display devices are connected in series to each other, when the main display device 20 controls the switch circuit 201 to be disconnected by the controller 200, the screens 212 and 222 of the slave display devices 21 and 22 do not display any image or displays a black image.

In short, through the display method, a plurality of interconnected display devices can determine the connection order and perform an image segmentation operation on the display image according to the connection order to respectively display a part of the display image.

Figure 3:
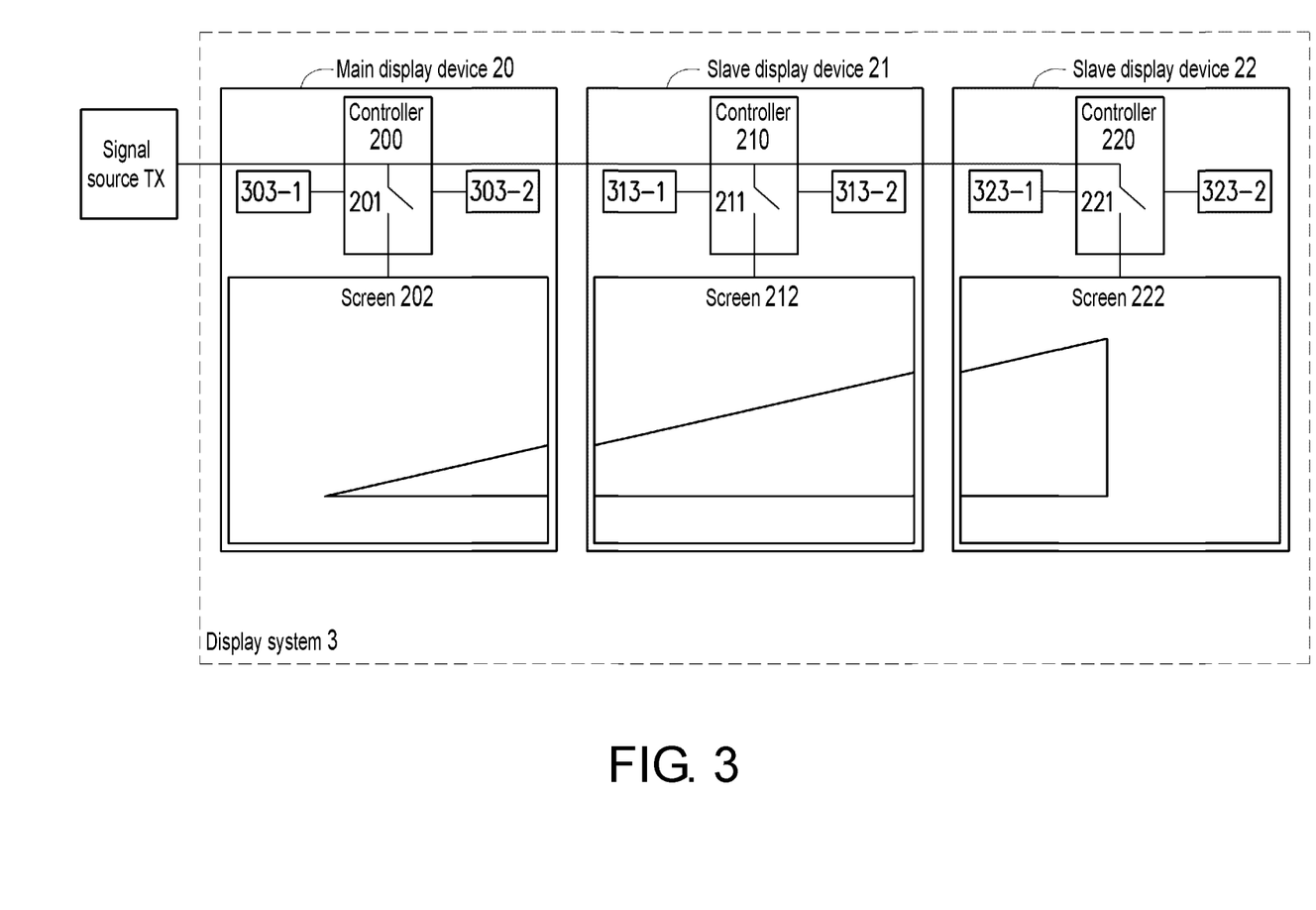
FIG. 3 is a schematic diagram of a display system according to another embodiment of the present disclosure.

Please refer to FIG. 3. FIG. 3 is a schematic diagram of a display system according to another embodiment of the present disclosure. The display system 3 is similar to the display system 2, so the same components are labeled with the same symbols. The difference between the display system 3 and the display system 2 shown in FIG. 2 is that a plurality of sensors are additionally disposed in each display device in the display system 3, and are coupled to corresponding controllers. The sensor of the display device can sense whether the display device is connected to other display devices in a specific direction, and transmits the sensing result to the controller. For example, the sensor 303-1 and the sensor 303-2 are respectively disposed on opposite sides of the main display device 20, wherein the sensor 303-2 of the main display device 20 can sense the connection with the slave display device 21, and thus transmitting the sensing result to the controller 200. Accordingly, the controller 200 of the main display device 20 can determine that other display devices are connected in the corresponding direction in which the sensor 303-2 is disposed. In addition, according to the sensing results returned by the sensors 303-1 and 303-2, the controller 200 of the main display device 20 can determine whether the position of the main display device 20 in the series is in the middle of the series or at one end of the series. Further, the sensor 313-1 and the sensor 313-2 are respectively disposed on opposite sides of the slave display device 21, wherein the sensor 313-1 of the slave display device 21 can sense the connection with the main display device 20 and the sensor 313-2 can sense the connection with the slave display device 22, thus transmitting the sensing result to the controller 210. The sensor 323-1 and the sensor 323-2 are respectively disposed on opposite sides of the slave display device 22. Although FIG. 3 only shows that each display device has two sensors, those skilled in the art can make modification to increase or decrease the number of sensors in the display device according to different usage requirements to adaptively sense the display device connected in different directions. For example, the display device can be configured with the sensor in four different directions, namely up, down, left, and right directions.

The method of sensing connection by the sensor in the display system 3 can be implemented by different embodiments. In an embodiment, the sensors 303-1, 303-2, 313-1, 313-2, 323-1 and 323-2 may be magnetic sensors, so that adjacent display devices are connected to each other by magnetic induction, and notify the controllers 200, 210 and 220 when being connected to each other. In other words, by the magnetic induction method, the main display device 20, the slave display device 21, and the slave display device 22 can determine the connection relationship with other display devices. In an embodiment, the sensors 303-1, 303-2, 313-1, 313-2, 323-1 and 323-2 may be specific pins of a port of the display device, and generate the sensing result by means of transmitting voltage signal, current signal and so on.

Each display device can be switched according to different usage conditions and display settings. For example, the main display device 20 is not connected to another display device, and then the main display device 20 is changed to be connected to another display device. Accordingly, the main display device 20 may be changed from individually displaying the display image to displaying a partial region of the display image. For example, under the condition that although the display device is connected to another display device, the display setting is set that the image segmentation operation is not performed, and the connected display device displays the display image. When the display setting is changed to perform the image segmentation operation, the connected display device can perform the image segmentation operation to display the corresponding segmented region of the display image according to the connection relationship.

Figure 4:
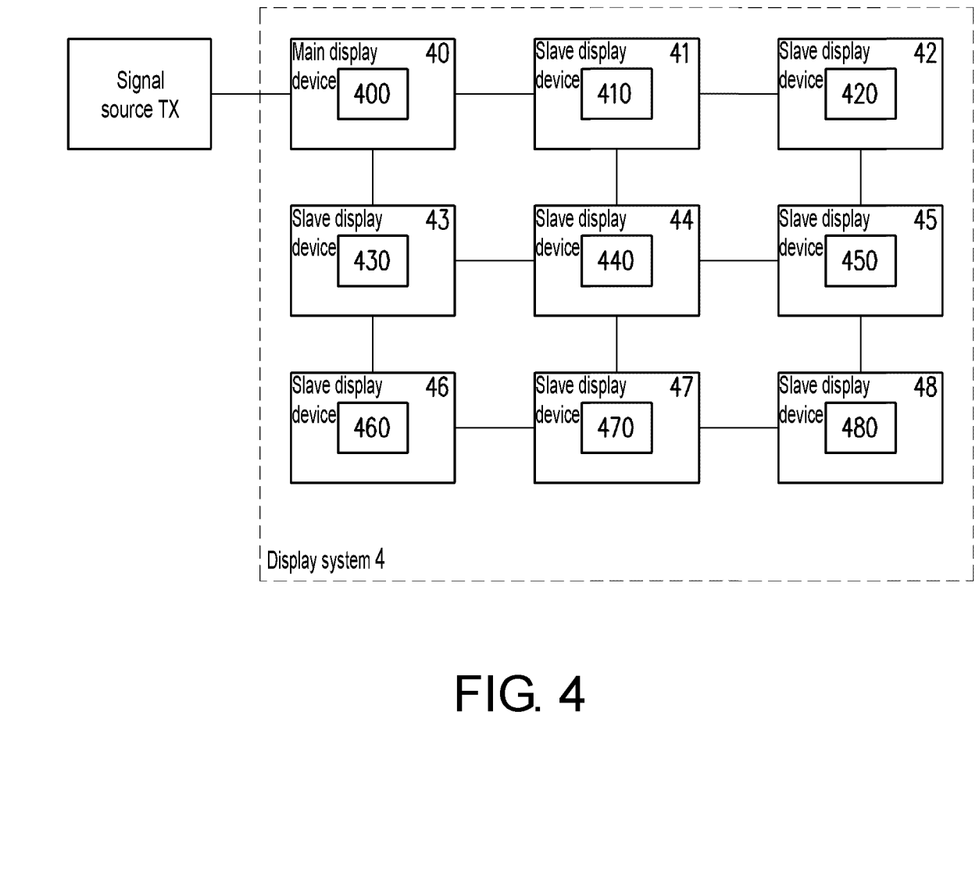
FIG. 4 is a schematic diagram of a display system according to still another embodiment of the present disclosure.

In addition to the display system 2 shown in FIG. 2 and the display system 3 shown in FIG. 3 which have display devices connected in series, the plurality of display devices in the display system can also be connected in a specific shape and arrangement. Please refer to FIG. 4. FIG. 4 is a schematic diagram of a display system according to still another embodiment of the present disclosure. There are nine display devices in the display system 4, including the main display device 40 and the slave display devices 41-48. In this embodiment, the main display device 40 and the slave display devices 41-48 are connected to each other and arranged in a rectangular array, but the disclosure is not limited thereto. In different embodiments, the display devices in the display system can be connected to each other and arranged into different shapes according to different design requirements, which are all within the scope of the present disclosure. For example, the display device of the display system can be arranged into different shapes such as a circle, a triangle, an arbitrary polygon, and the like. In order to facilitate the description of the overall connection relationship of the display system 4, some components of each display device in the display system 4 will be ignored (for example, the switching circuit, the screen and the sensor of the display device, etc.) for explanation. Please refer to FIG. 1 and FIG. 4 together to understand the operation of the display system 4.

In step 100, a plurality of display devices in the display system are serially connected to each other, and the main display device has EDID.

In step 101, the connection order of the display devices is configured to be set. The main display device 40 initiates an encoding operation to set the encoding value of each connected display device. Each display device returns the encoding value and the number of serial connections. For example, when the controller 400 of the main display device 40 senses that other slave display devices are connected in two different directions, the controller 400 of the main display device 40 first initiates the encoding operation on the series in the row direction, and then initiates the encoding operation on the series in the column direction. In other words, the main display device 40 in the display system 4 initiates the encoding operation on the slave display device 41 and the slave display device 42, and the slave display device 41 and the slave display device 42 first acquire the encoding value of the series in the row direction (for example, the encoding values of the main display device 40, the slave display device 41, and the slave display device 42 are 11, 12, and 13 respectively). Next, the main display device 40 initiates the encoding operation on the slave display device 43 and the slave display device 46 in the series in the column direction (for example, the encoding values of the main display device 40, the slave display device 43, and the slave display device 46 are 11, 21, and 31 respectively). The main display device 40 initiates the encoding operation on the slave display device 44 and the slave display device 47 in the series in the column direction (for example, the encoding values of the slave display device 41, the slave display device 44, and the slave display device 47 are 12, 22, and 32 respectively). The main display device 42 initiates the encoding operation on the slave display device 45 and the slave display device 48 in the series in the column direction (for example, the encoding values of the slave display device 42, the slave display device 45, and the slave display device 48 are 13, 23, and 33 respectively). After the slave display device at the end of the series (for example, the slave display device 48) completes the encoding operation, the encoding value is returned to the main display device 40, and the controller 400 of the main display device 40 can determine the number of rows and columns in which all the display devices are connected in the display system 4, the encoding value of each display device and the number of connections, and all of the slave display devices in the display system 4 can obtain their own encoding values and the number of serial connections.

In step 102, the controller 400 of the main display device 40 correspondingly changes the EDID of the main display device 40 according to the connection relationship of the display system 4, so that the signal source TX provides the display image signal that is consistent with the resolution of the display system 4.

In step 103, the main display device 40 is configured to receive the display image according to changed EDID. The signal source TX transmits the display image with adjusted resolution to the controller 400 of the main display device 40 according to the EDID changed by the main display device 40, and the controller 400 of the main display device 40 transmits the display image to the controllers 410-480 of all of the slave display devices 41-48 in the display system 4.

In step 104, the controller of each display device in the display system 4 respectively performs an image segmentation operation on the display image according to the connection order (i.e., the corresponding encoding value), so that the display devices respectively display the plurality of segmented regions of the display image with the changed resolution.

In summary, embodiments of the present disclosure at least have one of the following advantages or effects. The display method and the display system of the present disclosure can determine the number and order of connections of the display devices connected in series, thereby changing the EDID of the main display device, and the display devices connected in series can perform the image segmentation operation on the display image according to the connection order respectively to display the corresponding segmented regions of the display image, thereby providing a different viewing experience to the user.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display method, comprising:
configuring a plurality of display devices to be connected in series, the plurality of display devices comprising a main display device and at least one slave display device, the main display device having extended display identification data (EDID);
setting a connection order of the plurality of display devices;
changing the EDID of the main display device correspondingly according to the connection order of the plurality of display devices;
configuring the main display device to receive a display image according to the changed EDID; and
configuring the plurality of display devices to respectively perform an image segmentation operation on the display image according to the connection order to respectively display a plurality of segmented regions of the display image;
wherein the main display device is directly coupled to a signal source for receiving a display image from the signal source, and the at least one slave display device is connected in series to the main display device,
wherein a step of setting the connection order of the plurality of display devices comprises:
configuring the main display device to initiate an encoding operation, so that the at least one slave display device respectively sets at least one encoding value corresponding to the at least one slave display device.

2. The display method according to claim 1, wherein the display device respectively displays that the plurality of segmented regions of the display image do not overlap or partially overlap each other.

3. The display method according to claim 1, wherein the encoding operation comprises:
configuring the main display device to transmit an initial encoding value to the at least one slave display device;
configuring the at least one slave display device to respectively set the at least one encoding value corresponding to the at least one slave display device according to the received initial encoding value; and
configuring the at least one slave display device to return the number of connection to the main display device after completing setting the at least one corresponding encoding value.

4. The display method according to claim 3, wherein the main display device correspondingly changes the EDID of the main display device according to the initial encoding value of the main display device, the at least one encoding value corresponding to the at least one slave display device, and the number of connections.

5. The display method according to claim 4, wherein the step of configuring the plurality of display devices to perform the image segmentation operation on the display image according to the connection order respectively comprises:
extracting, by the at least one slave display device, the plurality of segmented regions of the display image according to a ratio of the at least one corresponding encoding value to the number of connections.

6. The display method according to claim 1, wherein the step of respectively displaying the plurality of segmented regions of the display image comprises:
performing a hot plugging operation by the plurality of display devices before respectively displaying the plurality of segmented regions of the display image.

7. The display method according to claim 1, wherein the main display device comprises a controller and a switch circuit, wherein the switch circuit is coupled to a signal source, wherein the step of respectively displaying the plurality of segmented regions of the display image comprises:
before the plurality of display devices respectively display the plurality of segmented regions of the display image, the controller of the main display device controls the switch circuit to perform a turning on and off operation for controlling the signal source to input the display image to the main display device.

8. The display method according to claim 1, wherein the step of configuring the plurality of display devices to be connected to each other in series comprises:
configuring two of the adjacent display devices among the plurality of display devices to be magnetically connected to each other.

9. The display method according to claim 1, wherein the plurality of display devices respectively comprise a plurality of controllers, and the plurality of controllers respectively perform the image segmentation operation on the display image according to the connection order.

10. A display system, comprising:
a plurality of interconnected display devices, the plurality of display devices comprising a main display device and at least one slave display device, wherein the main display device has ED1D,
wherein after a connection order of the plurality of display devices is set, the EDID of the main display device is correspondingly changed according to the connection order of the plurality of display devices, the main display device is configured to receive a display image according to the changed EDID;
wherein the plurality of display devices respectively perform an image segmentation operation on the display image according to the connection order to respectively display a plurality of segmented regions of the display image;
wherein the main display device is directly coupled to a signal source for receiving the display image from the signal source; the at least one slave display device is connected in series to the main display device, wherein the main display device initiates an encoding operation, and the at least one slave display device respectively sets at least one encoding value corresponding to the at least one slave display device.

11. The display system according to claim 10, wherein the plurality of display devices respectively display that the plurality of segmented regions of the display image do not overlap or partially overlap each other.

12. The display system according to claim 10, wherein the encoding operation comprises:

the main display device transmits an initial encoding value to the at least one slave display device;

the at least one slave display device respectively sets the at least one encoding value corresponding to the at least one slave display device according to the received initial encoding value; and the at least one slave display device returns number of connections to the main display device after completing setting the at least one corresponding encoding value.

13. The display system according to claim 12, wherein the main display device correspondingly changes the EDID of the main display device according to the initial encoding value of the main display device, the at least one encoding value corresponding to the at least one slave display device, and the number of connections.

14. The display system according to claim 13, wherein the at least one slave display device extracts the plurality of segmented regions of the display image according to a ratio of the at least one corresponding encoding value to the number of connections.

15. The display system according to claim 10, wherein the plurality of display devices perform a hot plugging operation before respectively displaying the plurality of segmented regions of the display image.

16. The display system according to claim 10, wherein the main display device comprises a controller and a switch circuit, the switch circuit is coupled to a signal source, before the plurality of display devices respectively display the plurality of segmented regions of the display image, the controller of the main display device controls the switch circuit to perform a turning on and off operation for controlling the signal source to input the display image to the main display device.

17. The display system according to claim 10, wherein two of the adjacent display devices among the plurality of display devices are configured to be magnetically connected to each other.

18. The display system according to claim 10, wherein the plurality of display devices respectively comprise a plurality of controllers, and the plurality of controllers respectively perform the image segmentation operation on the display image according to the connection order.

* * * * *

UNITED STATES PATENT AND TRADEMARK OFFICE
CERTIFICATE OF CORRECTION

PATENT NO. : 11,416,200 B2  
APPLICATION NO. : 17/075686  
DATED : August 16, 2022  
INVENTOR(S) : Wei-Wei Yin et al.

Page 1 of 1

It is certified that error appears in the above-identified patent and that said Letters Patent is hereby corrected as shown below:

On the Title Page

Item (73) Assignee Should read: Optoma Corporation, New Taipei City (TW)

Signed and Sealed this  
Twenty-seventh Day of September, 2022

Katherine Kelly Vidal  
*Director of the United States Patent and Trademark Office*